UNITED STATES PATENT OFFICE 2,573,580

PREPARATION OF AROMATIC SULFONES

Elbert C. Ladd, Passaic, N. J., assignor to United States Rubber Company, New York, N. Y., a corporation of New Jersey No Drawing. Application March 23, 1949,
Serial No. 83,102

8 Claims. (Cl. 260—607)

The invention relates to a novel method of synthesizing p-chlorophenyl omega-halogenoalkyl sulfones by the reaction of a p-chlorobenzenesulfonyl halide with an aliphatic monoolefin hydrocarbon having a terminal ethylenic group in the presence of free radicals. The invention also relates to certain new p-chlorophenyl omega-halogenoalkyl sulfones.

The reaction may be illustrated as follows:

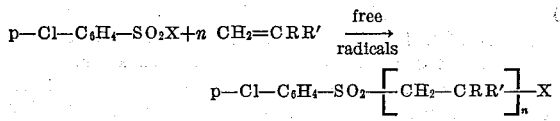

where X is halogen, preferably chlorine or bromine, $n$ is an integer of 1 or more, preferably an integer of from 1 to 5, and R and R' are hydrogen or alkyl.

This invention results from my discovery of the unexpectedly high degree of reactivity of the p-chlorobenzenesulfonyl halides with aliphatic 1-olefin hydrocarbons under free radical conditions. Many other analogous aryl sulfonyl halides display only moderate reactivity, and yield chiefly polymeric materials accompanied by only traces of the lower molecular weight products (i. e., products in which $n$ is 1 to 5 in the above formula). In contrast, I have made the unexpected discovery that in the reactions of my invention, the use of a p-chlorobenzenesulfonyl halide instead of the unsubstituted benzenesulfonyl halide leads readily to the formation of high yields of the lower molecular weight products, particularly those in which $n$ is from 1 to 5, which are commercially desirable.

Illustrative examples of reactants and products in the practice of my invention are as follows:

ticing my invention, examples being ethylene, propylene, 1-butene, isobutylene, 1-pentene, 2-methylbutene-1, 3-methylbutene-1, 1-hexene, 2,3-dimethylbutene-1, 3,3-dimethylbutene-1, 1-heptene, 1-octene, etc. The olefin will usually contain from 2 to 20 carbon atoms per molecule and may be primary, secondary or tertiary. Usually only one olefin hydrocarbon is employed although mixtures may be used.

The products of my invention are not only useful as plasticizers, flame-retardant agents and lube-oil additives, but also possess enhanced utility in these and other applications, e. g., polymerization, by virtue of their ability to undergo various reactions including hydrolysis, dehydrohalogenation, sulfonation and chlorination.

The reactions of my invention are carried out by heating, at temperatures of 25°–300° C., usually at 60°–200° C., a mixture of the p-chlorobenzenesulfonyl halide and the olefin hydrocarbon in molar ratios of from 1:10 to 20:1, particularly from 1:1 to 15:1, in the presence of a source of free radicals. The latter may be ultra-violet light or from 0.1 to 10% by weight (based on the reactants) of a promoter which is capable of undergoing thermal decomposition to yield free radicals, including peroxidic compounds (e. g., an inorganic peroxide such as hydrogen peroxide, or an organic peroxide such as benzoyl peroxide, acetyl peroxide and tertiary butyl hydrogenperoxide), metal alkyls (e. g., sodium amyl, lead tetraethyl), and alpha,alpha'-azobis(alpha-alkylalkanoic) acids and derivatives hydrolyzable thereto such as alpha,alpha'-azobis(isobutyronitrile), alpha,alpha'-azobis(isobutyric acid), and alpha,alpha'-azobis(alpha-methylbutyronitrile). In cases where volatile olefinic hydrocarbons are

| | Reactants | Products | |
|---|---|---|---|
| | | | where $n=1$ |
| (1) | $CH_2=CH_2 + p-Cl-C_6H_4-SO_2-Cl$ | $p-Cl-C_6H_4-SO_2-[CH_2-CH_2]_n-Cl$ | $p-Cl-C_6H_4-SO_2-CH_2-CH_2-Cl$ |
| | Ethylene | | |
| (2) | $CH_2=CH-CH_3 + p-Cl-C_6H_4-SO_2-Cl$ | $p-Cl-C_6H_4-SO_2-[CH_2-CH(CH_3)]_n-Cl$ | $p-Cl-C_6H_4-SO_2-CH_2-CHCl-CH_3$ |
| | Propylene | | |
| (3) | $CH_2=CH-C_2H_5 + p-Cl-C_6H_4-SO_2-Cl$ | $p-Cl-C_6H_4-SO_2-[CH_2-CH(C_2H_5)]_n-Cl$ | $p-Cl-C_6H_4-SO_2-CH_2-CHCl-C_2H_5$ |
| | 1-butene | | |
| (4) | $CH_2=C(CH_3)_2 + p-Cl-C_6H_4-SO_2-Cl$ | $p-Cl-C_6H_4-SO_2-[CH_2-C(CH_3)_2]_n-Cl$ | $p-Cl-C_6H_4-SO_2-CH_2-C(CH_3)_2Cl$ |
| | Isobutylene | | |

Any aliphatic monoolefin hydrocarbon having a terminal ethylenic linkage may be used in practicing my invention, examples being ethylene, employed as reactants, superatmospheric pressures, e. g., 10–200 atmospheres, may be employed.

Inert diluents, particularly hydrocarbons such as hexane, octane, cyclohexane, benzene and toluene, can also be present. The reaction times vary somewhat with the reactants employed, but from 2 to 48 hours are generally adequate, and 2–24 hours often suffice.

The reaction products can be isolated and purified by preferential extraction, fractional distillation or crystallization.

The following examples disclose my invention in more detail.

Example 1

A mixture of 315 grams of p-chlorobenzenesulfonyl chloride and 12.3 grams of alpha,alpha'-azobis(isobutyronitrile) is enclosed in a 1.25-liter autoclave. The latter is evacuated and ethylene is then admitted until a pressure of 1500 p. s. i. is attained at 70° C. The reaction is continued for 24 hours at 70° C. with agitation, the initial pressure being maintained by the addition of ethylene.

At the end of the reaction, the autoclave is vented and the reaction mixture is distilled to yield:

(a) 74.1 grams of liquid, boiling in the range 134–168° C./0.4–0.6 mm., which is chiefly the 1:1 adduct, 2-chloroethyl p-chlorophenyl sulfone (% chlorine=28.3; theory=29.7%).

(b) 127.0 grams of material, boiling in the range of 168–184° C./0.6–0.8 mm., which is chiefly the 2:1 adduct, a new compound, 4-chlorobutyl p-chlorophenyl sulfone (%/chlorine=26.7%; theory=26.7%).

(c) 52.7 grams of higher-boiling adducts containing a considerable proportion of the 4:1 adduct, 8-chlorooctyl p-chlorophenyl sulfone (% chlorine=22.5; theory=21.9).

Repetition of the above reaction with benzenesulfonyl chloride results in a smaller total yield of reaction products from which only a trace of the 1:1 adduct and a small amount of the 2:1 adduct can be isolated.

Example 2

A mixture of 300 grams of p-chlorobenzenesulfonyl chloride, 168 parts of isobutylene and 28.3 parts of benzoyl peroxide is enclosed in an autoclave and heated at 70° C. for 63 hours. Fractional crystallization of the reaction mixture from methanol yields 286 grams of the 1:1 adduct, which is the new compound, 2-chloroisobutyl p-chlorophenyl sulfone, m. 82–3° C. (% chlorine=25.7 found, theory=26.6; percent sulfur=11.87 found, theory=12.0).

Certain of the compounds synthesized by my method are new chemicals. Thus to the best of my knowledge and belief I am the first to make those products which are of the type formula

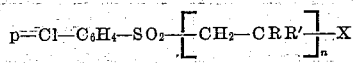

where $n$ is an integer of from 2 to 5 and where X, R and R' are as before. I also believe that I am the first to make the 2:1 and 4:1 adducts of ethylene and p-chlorobenzenesulfonyl halide (as described in Example 1 above) and the adduct of isobutylene and p-chlorobenzenesulfonyl halide (Example 2).

From the foregoing it will be seen that the present invention provides a simple and convenient method of preparing a broad class of chemicals, namely, the p-chlorophenyl omega-halogenoalkyl sulfones, from readily available materials. The process of my invention is particularly characterized by its high flexibility whereby any compound in this class can be prepared by selection of appropriate reactants and reaction conditions. The great flexibility and convenience of my process is in marked contrast to the prior art methods whereby only a very few members of the above class (i. e., the class wherein $n$ ranges from 1 to 5) can be produced and those only by an extremely complicated synthesis involving several difficult steps.

A very great advantage of the process of the present invention is that it yields predominantly or exclusively the lower adducts, i. e., those having from 1 to 5 mols of combined olefin per mol of combined p-chlorobenzenesulfonyl halide.

Having thus described my invention, what I claim and desire to protect by Letters Patent is:

1. The method of making a p-chlorophenyl omega-halogenoalkyl sulfone having the formula

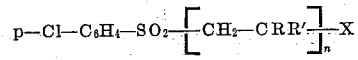

where X is halogen selected from the group consisting of chlorine and bromine and $n$ is an integer of from 1 to 5 and R and R' are selected from the group consisting of hydrogen and alkyl which comprises subjecting a mixture of a p-chlorobenzenesulfonyl halide having the formula

where X is halogen selected from the group consisting of chlorine and bromine and an aliphatic monoolefinic hydrocarbon having a terminal ethylenic group at a temperature of from 25 to 300° C to the action of a free radical reaction initiator and thereby causing said halide and hydrocarbon to interact and form said p-chlorophenyl omega-halogenoalkyl sulfone.

2. The method of making a p-chlorophenyl omega-halogenoalkyl sulfone having the formula

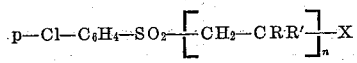

where X is halogen selected from the group consisting of chlorine and bromine and $n$ is an integer of from 1 to 5 and R and R' are selected from the group consisting of hydrogen and alkyl which comprises subjecting a mixture of a p-chlorobenzenesulfonyl halide having the formula

where X is halogen selected from the group consisting of chlorine and bromine, an aliphatic monoolefinic hydrocarbon having a terminal ethylenic group, at a temperature of from 60 to 200° C. to the action of a free radical reaction initiator composed of a compound which undergoes thermal decomposition at said temperature and liberates free radicals, said compound being selected from the group consisting of peroxidic compounds, metal alkyls and alpha,alpha'-azobis(alpha-alkylalkanoic) acids and derivatives hydrolyzable to said acids, and thereby causing said halide and said hydrocarbon to interact and form said p-chlorophenyl omega-halogenoalkyl sulfone.

3. The method which comprises subjecting a mixture of a p-chlorobenzenesulfonyl halide having the formula

where X is halogen selected from the group consisting of chlorine and bromine and ethylene at a temperature of from 25 to 300° C. to the action of a free radical reaction initiator and thereby causing said halide and ethylene to interact and form a compound having the formula

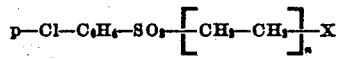

where X is halogen and n is an integer of from 1 to 5, and recovering said compound from the reaction mixture.

4. The method which comprises subjecting a mixture of a p-chlorobenzenesulfonyl halide having the formula

where X is halogen selected from the group consisting of chlorine and bromine and isobutylene at a temperature of from 25 to 300° C. to the action of a free radical reaction initiator and thereby causing said halide and ethylene to interact and form a compound having the formula

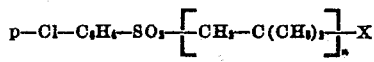

where X is halogen and n is an integer of from 1 to 5, and recovering said compound from the reaction mixture.

5. A chemical compound having the formula

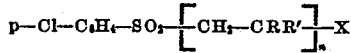

where X is halogen selected from the group consisting of chlorine and bromine, n is an integer of from 2 to 5 and R and R' are selected from the class consisting of hydrogen and alkyl groups.

6. The chemical 4-chlorobutyl p-chlorophenyl sulfone.

7. The chemical 8-chlorooctyl p-chlorophenyl sulfone.

8. The chemical 2-chloroisobutyl p-chlorophenyl sulfone.

ELBERT C. LADD.

REFERENCES CITED

The following references are of record in the file of this patent:

B. I. O. S. Final Report No. 1095, item No. 22, page 20, May-June 1946.